US008784695B2

(12) United States Patent
Choi et al.

(10) Patent No.: US 8,784,695 B2
(45) Date of Patent: Jul. 22, 2014

(54) METHOD FOR MANUFACTURING POLYURETHANE NANOCOMPOSITE COMPRISING EXPANDED GRAPHITE AND COMPOSITION THEREOF

(75) Inventors: Suk-Hong Choi, Seoul (KR); Sang-Hee Park, Gyeonggi-do (KR)

(73) Assignee: G&CS Co., Ltd. (KR)

( * ) Notice: Subject to any disclaimer, the term of this patent is extended or adjusted under 35 U.S.C. 154(b) by 386 days.

(21) Appl. No.: 13/174,571

(22) Filed: Jun. 30, 2011

(65) Prior Publication Data

US 2013/0001462 A1    Jan. 3, 2013

(51) Int. Cl.
*H01B 1/24* (2006.01)
*C08L 75/04* (2006.01)

(52) U.S. Cl.
CPC .. *H01B 1/24* (2013.01); *C08L 75/04* (2013.01)
USPC ......................................................... 252/510

(58) Field of Classification Search
None
See application file for complete search history.

(56) References Cited

U.S. PATENT DOCUMENTS 7,745,528 B2   6/2010  Prud'Homme et al.
7,776,445 B2   8/2010  Lee et al.
2008/0306225 A1*  12/2008  Prud'Homme et al. ........ 526/89
2009/0036605 A1*  2/2009  Ver Meer ........................ 525/55
2009/0071533 A1   3/2009  Choi et al.
2009/0155561 A1   6/2009  Choi et al.
2009/0155578 A1*  6/2009  Zhamu et al. ................. 428/336
2010/0130701 A1*  5/2010  Lahdensuo ................... 525/453
2011/0046287 A1*  2/2011  Harikrishnan et al. ....... 524/445
2012/0065311 A1*  3/2012  Chakraborty et al. ........ 524/364

OTHER PUBLICATIONS

Stankovich, S. et al., "Synthesis and exfoliation of isocyanate-treated graphene oxide nanoplatelets," Carbon, 44, pp. 3342-3347 (2006).*
Kim et al., "Morphology and Properties of Exfoliated Graphite/Thermoplastic Polyurethane Nanocomposites," ANTEC 2009, pp. 122-125.*
Tim J. Booth et al., Macroscopic Graphene Membranes and Their Extraordinary Stiffness, Nano Letters, 2008, 2442-2446, vol. 8, No. 8, American Chemical Society, US.

* cited by examiner

*Primary Examiner* — Harold Pyon
*Assistant Examiner* — Jaison Thomas

(57) ABSTRACT

Disclosed herein is a method of manufacturing a nanocomposite using expanded graphite. The method is characterized in that monomers are formed into a polymer between the plate-shaped layers of the expanded graphite, and the polymer is intercalated therebetween, so that the plate-shaped layers of the expanded graphite are completely exfoliated or are formed into graphene, with the result that the expanded graphite is completely dispersed in a polymer matrix. The nanocomposite manufactured by this method has excellent electrical conductivity and thermal conductivity because the expanded graphite is uniformly dispersed in this nanocomposite.

11 Claims, 2 Drawing Sheets

| Products | Cross sectional view (10,000 magnification) |
|---|---|
| Expanded Graphite |  |
| sample 1 |  |
| sample 2 |  |
| sample 3 |  |

METHOD FOR MANUFACTURING POLYURETHANE NANOCOMPOSITE COMPRISING EXPANDED GRAPHITE AND COMPOSITION THEREOF

BACKGROUND OF THE INVENTION

1. Technical Field

The present invention relates to a method of manufacturing a nanocomposite using expanded graphite, and, more particularly, to a method of manufacturing a nanocomposite by dispersing expanded graphite in a polymer, wherein the expanded graphite is obtained by separating regularly and strongly bonded plate structures from graphite.

2. Description of the Related Art

Graphite is a mineral having a hexagonal plate-shaped crystal structure and belonging to a hexagonal crystal system. Graphite is black, has a metallic luster, is electrically conductive, and is used for pencil leads and for electrodes for crucibles, electric furnaces, arc furnaces, and the like, and is used as a solid lubricant. Graphite is most characterized in that it has high heat resistance, impact resistance, and corrosion resistance, has a very small thermal expansion coefficient, and has excellent thermal conductivity and electrical conductivity compared to other materials. Further, graphite is also characterized in that its various physical properties such as shape, color, gloss, hardness, specific gravity, thermal conductivity, electrical conductivity, etc., are changed depending on its crystal structure and microstructure.

Natural graphite is a mineral consisting of carbon, and has a hexagonal plate-shaped crystal structure and belongs to a hexagonal crystal system. Graphite is a scale-like multilayered material, and each layer is provided therein with strong carbon covalent bonds (sp2 hybrid), but layers are connected to each other by Van der Waals' force applied therebetween. For this reason, graphite has a plate-like structure having a perfect cleavage plane, and has half-metallic properties of both a metal and a semiconductor.

In graphite, the height of one hexagonal plate-shaped layer is 3.40 Å, and the distance between most adjacent carbons in a hexagonal ring is 1.42 Å. Further, the distance between the upper plate-shaped layer and lower plate-shaped layer is much greater than the distance between the centers of two carbon atoms. For this reason, electrons located over or under the hexagonal plate-shaped layer can freely move, and thus graphite has excellent electrical conductivity. Since diamond, which is allotropic to graphite, has four electrons bonded with each other by strong covalent bonds (sp3 hybrid), it becomes an excellent electric insulator.

When crystalline flaky graphite is oxidized with concentrated sulfuric acid and a hydrogen peroxide solution, washed with water, and then put into a high-temperature expansion furnace, it is expanded in the direction of a c axis of graphite crystal. The crystalline flaky graphite expanded to 100~700% of initial volume thereof is referred to as "expanded graphite". This expanded graphite is used in materials for heat-resistant equipment, materials for steel casting, materials for ingot covers, electrodes for steel-making furnaces, high-elasticity refractory materials for furniture and mattresses, and the like. Recently, expanded graphite has been actively used in heat radiation materials for electrical appliances, thermal conduction sheets, fire retardants, conductive fillers, semiconductor parts, materials for light emitting displays (LEDs), materials for field emission displays, and the like. When carbon nanotubes (CNTs), similar to graphite, are synthesized and then refined, the yield thereof is very low. Therefore, even when synthesis is conducted using inexpensive materials, the final product of carbon nanotubes is expensive, whereas the final product of graphite is very inexpensive. Single-wall carbon nanotubes (SWNTs) are characterized in that the metallic properties and semiconductor properties thereof are changed depending on the chirality and diameter thereof, and in that the band gaps thereof are different from each other although they have the same semiconductor properties. Therefore, in order to use specific semiconductor properties and metallic properties from the single-wall carbon nanotubes (SWNTs), it is required to separate all of the single-wall carbon nanotubes (SWNTs). However, it is known that it is very difficult to completely separate these single-wall carbon nanotubes (SWNTs).

In the 1960's, polymer-based composites appeared as a new paradigm in the field of materials. Currently, in addition to the polymer-based composites, polymer nanocomposites are being actively developed. Polymer nanocomposites may be manufactured to have high strength, excellent durability, and various functions. Such a polymer nanocomposite is disclosed in the publication Nature Nanotechnology, entitled "Functionalized Graphene Sheets for Polymer Nanocomposites", jointly researched by study groups in the U.S.A and U.A.E. Further, the Georgia Institute of Technology in the U.S.A and CNRS in France reported that a transistor and a loop circuit were manufactured using graphene, which is a thin graphite layer. Further, according to the journal "Nano Letters", which is a journal of the American Chemical Society, Kostya Novoselov and others reported that graphene was used as a transparent conductive coating agent for an electrooptical device. In addition, researchers of the Max Planck Institute in Germany reported that a transparent electrode for a solar battery was developed using a graphene-based film. KR-A-2009-0065206, KR-A-2009-0017454, and KR-A-2009-0028007 also disclose methods of manufacturing an electronic device, such as a sheet, a solar cell, or the like using graphene, and KR-A-2009-0086536 discloses a method of manufacturing a functional graphene-rubber nanocomposite.

SUMMARY OF THE INVENTION

Accordingly, the present invention has been devised to solve the above-mentioned problems, and a first object of the present invention is to provide an expanded graphite-dispersed solution and a method of preparing the same.

A second object of the present invention is to provide an expanded graphite-dispersed polyurethane conductive resin.

A third object of the present invention is to provide an expanded graphite-dispersed nanocomposite and a composition thereof.

In order to accomplish the above objects, an aspect of the present invention provides a method of manufacturing a nanocomposite, including the steps of: dissolving expanded graphite in an organic solvent to prepare an expanded graphite-dispersed solution; mixing a polyol and a diol with a catalyst and then reacting the mixture with a diisocyanate to form a prepolymer; introducing the expanded graphite-dispersed solution into the prepolymer; and introducing a chain extender into the prepolymer.

BRIEF DESCRIPTION OF THE DRAWINGS

The above and other objects, features and advantages of the present invention will be more clearly understood from the following detailed description taken in conjunction with the accompanying drawing, in which.

DESCRIPTION OF THE PREFERRED EMBODIMENTS

Figure 1:
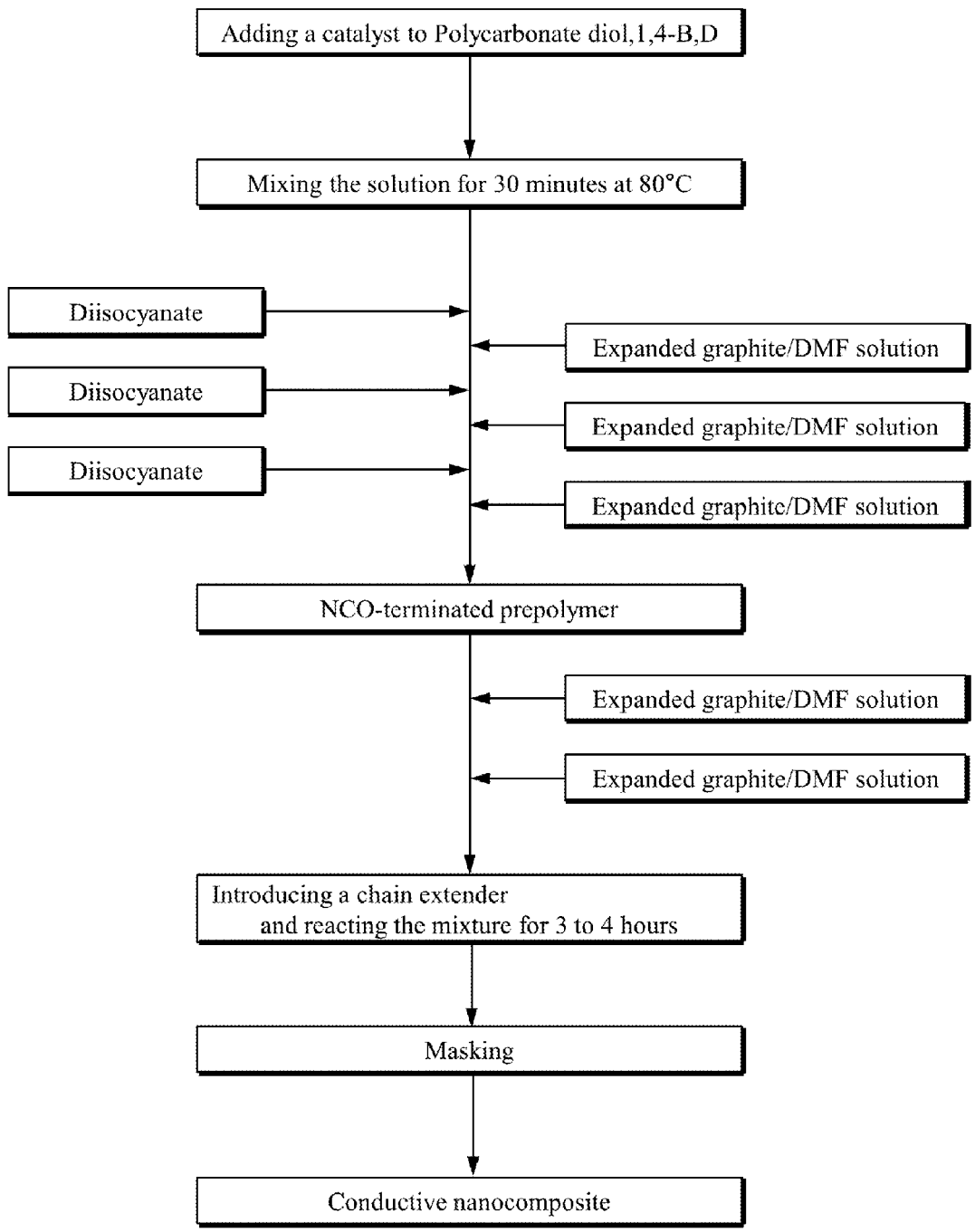
FIG. 1 shows a process of manufacturing an expanded graphite-polyurethane nanocomposite according to the present invention.

Hereinafter, the present invention will be described in detail with reference to the following Examples.

EXAMPLE 1

Preparation of Expanded Graphite-Dispersed Solution

An expanded graphite-dispersed solution was prepared by dissolving graphite expanded to 100~700% in an organic solvent containing a dispersant and then conducting ultrasonic treatment and milling. The organic solvent may be at least one selected from the group consisting of dimethylformamide (DMF), methyl ethyl ketone (MEK), toluene, and acetone. As the dispersant, an organic compound such as sodium dodecyl sulfate (SDS) or the like may be used. The components and composition ratio used in the preparation of the expanded graphite-dispersed solution are as follows (refer to Table 1 below).

TABLE 1

| components | contents | composition ratio |
|---|---|---|
| Expanded graphite | 500% expanded graphite | 5 wt % |
| solvent | DMF | 94.9 wt % |
| dispersant | SDS(sodium dodecyl sulfate) | 0.1 wt % |
| dispersion method | Ultra sonic treatment: more than 30 min at 300 W Ball milling: more than 30 min | — |

EXAMPLE 2

Synthesis of Nanocomposite

A nanocomposite was manufactured by reacting a polyol and an expanded graphite-dispersed solution with a diisocyanate to prepare a prepolymer and then chain-extending the prepolymer. The method of manufacturing a nanocomposite includes the steps of: mixing a polyol and a diol with a catalyst at 75° C.~85° C. (preferably, about 8° C.) for 30 minutes; reacting the mixture with the diisocyanate at 75° C.~85° C. (preferably, about 8° C.) for 3~5 hours to form a prepolymer; stepwisely introducing an expanded graphite-dispersed solution into the prepolymer 3~8 times; and ascertaining the end —NCO of the prepolymer and then introducing a chain extender into the prepolymer.

The polyol may be at least one selected from the group consisting of polyester polyol, polycarbonate diol, polypropylene glycol, polyethylene glycol, poly(tetramethylene) glycol, and polycarprolactone glycol. The diol may be at least one selected from the group consisting of 1, 4-butanediol, ethylene glycol, diethylene glycol, and 1, 6-hexanediol. The chain extender may be at least one selected from the group consisting of ethylene diamine, ethylene triamine, 1, 4-butanediol, ethylene glycol, diethylene glycol, and 1, 6-hexanediol.

In the process of manufacturing a nanocomposite, since the viscosity of the prepolymer is increased by polycondensation, the expanded graphite-dispersed solution is introduced into the prepolymer while maintaining the viscosity thereof at 100,000~150,000 cps, thus increasing the molecular weight of the prepolymer. Urethane groups are primarily formed between the plate-shaped layers of the expanded graphite. Subsequently, the urethane groups are formed into a polyurethane prepolymer by a polycondensation reaction, and the polyurethane prepolymer is intercalated between the plate-shaped layers of the expanded graphite. The intercalated polyurethane prepolymer is formed into a polyurethane polymer by a chain extending reaction, and simultaneously the plate-shaped layers of the expanded graphite are exfoliated. The method of manufacturing a nanocomposite according to the present invention is advantageous in that it is possible to prevent graphite from aggregating, and in that, since nano-sized graphite particles are dispersed in a polyurethane resin, a final product can exhibit excellent electrical conductivity and thermal conductivity, and the storage stability of a polyurethane coating solution can be maintained.

TABLE 2

| Components | Sample 1 | Sample 2 unit: mole | Sample 3 |
|---|---|---|---|
| Polycarbonate diol | 0.3 | 0.3 | 0.3 |
| Diisocyanate (MDI) | 1 | 1 | 1 |
| 1,4-butanediol | 0.4 | 0.4 | 0.4 |
| Diethylene glycol | 0.3 | 0.3 | 0.3 |
| Expanded graphite/ DMF dispersed solution | 150 g | 150 g | 150 g |
| Content of expanded graphite | 3 wt % | 5 wt % | 7 wt % |

* Content of expanded graphite is based on 100% of nanocomposite.

EXPERIMENTAL EXAMPLE 1

Analysis of Expanded Graphite/Polyurethane Nanocomposite

1. FT-IR Analysis

As the result of FT-IR analysis of an expanded graphite-dispersed polyurethane nanocomposite resin, it can be ascertained that this expanded graphite-dispersed polyurethane nanocomposite resin is a typical polyurethane resin containing a urethane group. From the FT-IR spectrum, it can be ascertained that a specific peak attributable to graphite was not observed, and that graphite was not chemically bonded with a urethane resin.

2. Measurement of Surface Resistance and Thermal Conductivity

A release paper was coated with a polyurethane nanocomposite resin to form a film, and then the electrical resistance of the film was measured by an electrical resistance meter. The surface resistance of the film is represented by a resistance value indicating whether free movement of electrons on the surface of the film is disturbed to some degree, and the surface resistance thereof influences antistatic characteristics and thermal radiation properties. As the result of measuring the surface resistance and thermal conductivity of the polyurethane nanocomposite manufactured according to the present invention, it can be ascertained that, as the content of expanded graphite increases, the surface resistance of the polyurethane nanocomposite decreases, and the thermal conductivity thereof increases.

TABLE 3

| Products | Electrical resistance (Ω/sq) |
|---|---|
| Sample 1 | $1.3 \times 10^7$ |
| Sample 2 | $1.3 \times 10^4$ |
| Sample 3 | $1.3 \times 10^2$ |

3. Field Emission Scanning Electron Microscopy (FE-SEM) Analysis

Figure 2:
FIG. 2 includes FE-SEM images showing microstructures of sample polyurethane nanocomposite products prepared according to some embodiments of the present disclosure.
Figure 2:
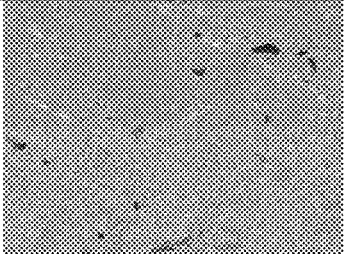
Figure 2:
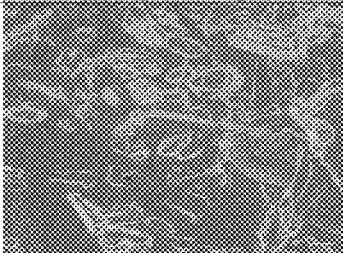
Figure 2:
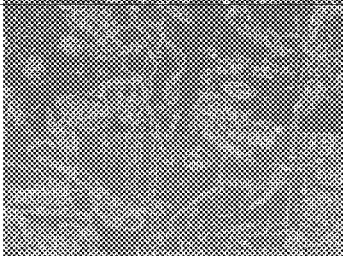

In FIG. 2, FE-SEM images show microstructures of sample polyurethane nanocomposite products prepared according to some embodiments of the present disclosure.

TABLE 4

| | Thermal conductivity | |
|---|---|---|
| Products | Horizontal direction (W/m° K) | Vertical direction (W/m° K) |
| Sample 1 | 0.96 | 0.25 |
| Sample 2 | 1.83 | 0.43 |
| Sample 3 | 2.55 | 0.57 |

Hitherto, the polyurethane nanocomposite according to an embodiment of the present invention has been described.

Meanwhile, in addition to the polyurethane nanocomposite, an acryl resin nanocomposite, an epoxy resin nanocomposite, a polyester resin nanocomposite, a polyamide resin nanocomposite, a polyvinyl chloride nanocomposite, a polyethylene nanocomposite, or a polypropylene nanocomposite can also be manufactured. That is, such a nanocomposite can be manufactured by introducing 3~7 wt % of expanded graphite into a prepolymer of a conventionally known nanocomposite.

As described above, according to the present invention, at the time of synthesis of a nanocomposite, when expanded graphite dispersed in a solvent is sequentially introduced into a polymerization process together with monomers of a polyol, a diisocyanate, a diol, and a chain extender, these monomers are grown into a polymer between plate-shaped layers of the expanded graphite, and the polymer is intercalated therebetween. In this case, when these monomers are further polymerized, the plate-shaped layers of the expanded graphite are completely exfoliated. In the nanocomposite synthesized in this way, since graphite is uniformly dispersed in a polymer matrix, when a film or a coating agent is formed using this nanocomposite, the formed film or coating agent can exhibit excellent physical properties, electrical conductivity, and radiation characteristics. Further, since this nanocomposite can prevent graphite from precipitating even when it is stored for a long period of time, the storage stability of the coating agent formed using this nanocomposite can be improved.

Although the preferred embodiments of the present invention have been disclosed for illustrative purposes, those skilled in the art will appreciate that various modifications, additions, and substitutions are possible without departing from the scope and spirit of the invention as disclosed in the accompanying claims.

What is claimed is:

1. A method of manufacturing a nanocomposite, comprising the steps of:
   dissolving expanded graphite in an organic solvent to prepare an expanded graphite-dispersed solution;
   mixing a polyol and a diol with a catalyst and reacting the mixture with a diisocyanate to form a prepolymer;
   introducing the expanded graphite-dispersed solution into the prepolymer; and
   introducing a chain extender into the prepolymer.

2. The method of manufacturing a nanocomposite according to claim 1, wherein the organic solvent is at least one selected from the group consisting of dimethylformamide (DMF), methyl ethyl ketone (MEK), toluene, and acetone.

3. The method of manufacturing a nanocomposite according to claim 2, wherein the organic solvent further includes a dispersant.

4. The method of manufacturing a nanocomposite according to claim 3, further comprising the step of ultrasonic-treating the expanded graphite-dispersed solution.

5. The method of manufacturing a nanocomposite according to claim 1,
   wherein the polyol is at least one selected from the group consisting of polyester polyol, polycarbonate diol, polypropylene glycol, polyethylene glycol, poly(tetramethylene)glycol, and polycarprolactone glycol, and
   the diol is at least one selected from the group consisting of 1,4-butanediol, ethylene glycol, diethylene glycol, and 1,6-hexanediol.

6. The method of manufacturing a nanocomposite according to claim 1, wherein the chain extender is at least one selected from the group consisting of ethylene diamine, ethylene triamine, 1,4-butanediol, ethylene glycol, diethylene glycol, and 1,6-hexanediol.

7. The method of manufacturing a nanocomposite according to claim 1, wherein the prepolymer is formed at 75~85° C.

8. The method of manufacturing a nanocomposite according to claim 1, wherein the expanded graphite-dispersed solution is introduced into the prepolymer while maintaining the viscosity of the prepolymer at 100,000~150,000cps.

9. The method of manufacturing a nanocomposite according to claim 1, wherein the nanocomposite comprises the expanded graphite in an amount of 3~7 wt %.

10. The method of manufacturing a nanocomposite according to claim 9, wherein the nanocomposite has electrical resistance of $1.3 \times 10^2$~$1.3 \times 10^7$ (Ω/sq).

11. The method of manufacturing a nanocomposite according to claim 9, wherein the nanocomposite has thermal conductivity of 0.96~2.55 W/m°K in a horizontal direction, and has thermal conductivity of 0.25~0.57 W/m°K in a vertical direction.

* * * * *